US011009591B2

(12) United States Patent
Eshet et al.

(10) Patent No.: US 11,009,591 B2
(45) Date of Patent: May 18, 2021

(54) DEEP LEARNING FOR DE-ALIASING AND CONFIGURING A RADAR SYSTEM

(71) Applicant: GM Global Technology Operations LLC, Detroit, MI (US)

(72) Inventors: Yaron Eshet, Haifa (IL); Oded Bialer, Petah Tivak (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 324 days.

(21) Appl. No.: 16/264,826

(22) Filed: Feb. 1, 2019

(65) Prior Publication Data
US 2020/0249315 A1    Aug. 6, 2020

(51) Int. Cl.
  *G01S 7/41*     (2006.01)
  *G01S 13/931*   (2020.01)

(52) U.S. Cl.
  CPC .......... *G01S 7/417* (2013.01); *G01S 13/931* (2013.01)

(58) Field of Classification Search
  CPC .... G01S 7/41; G01S 7/411–414; G01S 7/417; G01S 13/931
  See application file for complete search history.

(56) References Cited

U.S. PATENT DOCUMENTS

| 5,247,303 A * | 9/1993 | Cornelius ............. G01S 13/528 342/26 D |
| 6,894,639 B1 * | 5/2005 | Katz ....................... G01S 7/417 342/159 |
| 7,295,154 B2 * | 11/2007 | Walton .................... G01S 13/32 342/194 |
| 10,539,672 B2 * | 1/2020 | Bilik ..................... G05D 1/0257 |
| 2011/0012778 A1 * | 1/2011 | Nguyen .............. G01S 13/9017 342/25 A |
| 2016/0124086 A1 * | 5/2016 | Jansen .................. G01S 13/931 342/93 |
| 2020/0158822 A1 * | 5/2020 | Owens .................... G01S 7/415 |
| 2021/0011151 A1 * | 1/2021 | Longman ................. G01S 7/03 |

* cited by examiner

*Primary Examiner* — Peter M Bythrow
(74) *Attorney, Agent, or Firm* — Cantor Colburn LLP (57) ABSTRACT

Deep learning in a radar system includes obtaining unaliased time samples from a first radar system. A method includes under-sampling the un-aliased time samples to obtain aliased time samples of a first configuration, matched filtering the un-aliased time samples to obtain an un-aliased data cube and the aliased time samples to obtain an aliased data cube, and using a first neural network to obtain a de-aliased data cube. A first neural network is trained to obtain a trained first neural network. The under-sampling of the un-aliased time samples is repeated to obtain second aliased time samples of a second configuration. The method includes training a second neural network to obtain a trained second neural network, comparing results to choose a selected neural network corresponding with a selected configuration, and using the selected neural network with a second radar system that has the selected configuration to detect one or more objects.

20 Claims, 6 Drawing Sheets

DEEP LEARNING FOR DE-ALIASING AND CONFIGURING A RADAR SYSTEM

INTRODUCTION

The subject disclosure relates to deep learning for de-aliasing and configuring a radar system.

Radio detection and ranging (radar) systems are increasingly used to detect or track objects in various applications. For example, a radar system may be deployed in a vehicle (e.g., automobile, truck, construction equipment, farm equipment, automated factory equipment) to detect objects and to facilitate augmentation or automation of vehicle operation. Under certain conditions, the detection can be aliased, meaning that multiple interpretations of the results are possible. Accordingly, it is desirable to provide deep learning for de-aliasing and configuring a radar system.

SUMMARY

In one exemplary embodiment, a method of using deep learning for de-aliasing in a radar system includes obtaining unaliased time samples from reflections based on transmissions by a first radar system of multiple frequency-modulated signals. The first radar system includes multiple transmit elements and multiple receive elements. The method also includes performing under-sampling of the un-aliased time samples to obtain aliased time samples corresponding with a first configuration of an ambiguous radar system, implementing a matched filter on the un-aliased time samples to obtain an un-aliased data cube and on the aliased time samples to obtain an aliased data cube, processing the aliased data cube with a first neural network to obtain a de-aliased data cube, and training a first neural network based on a first loss obtained by comparing the un-aliased data cube with de-aliased data cube to obtain a trained first neural network. The performing the under-sampling of the un-aliased time samples is repeated to obtain second aliased time samples corresponding with a second configuration of the ambiguous radar system. A second neural network is trained using the second configuration of the ambiguous radar system to obtain a trained second neural network. Results of the trained first neural network and the trained second neural network are compared to choose a selected neural network corresponding with a selected configuration of the ambiguous radar system. The selected neural network is used with a second radar system that has the selected configuration of the ambiguous radar system to detect one or more objects.

In addition to one or more of the features described herein, the method also includes disposing the second radar system in a vehicle.

In addition to one or more of the features described herein, the method also includes performing detection of the one or more objects using the un-aliased data cube and using the de-aliased data cube.

In addition to one or more of the features described herein, the training the neural network is based on a second loss obtained by comparing a result of the detection performed using the un-aliased data cube with a result of the detection performed using the de-aliased data cube.

In addition to one or more of the features described herein, the method also includes inverting the de-aliased data cube to obtain de-aliased time samples.

In addition to one or more of the features described herein, the training the neural network is based on a third loss obtained by comparing the un-aliased time samples with the de-aliased time samples.

In addition to one or more of the features described herein, the performing the under-sampling includes using all the un-aliased time samples resulting from only a sub-set of the multiple frequency-modulated signals.

In addition to one or more of the features described herein, the performing the under-sampling includes using only a sub-set of the un-aliased time samples resulting from all the multiple frequency-modulated signals.

In addition to one or more of the features described herein, the performing the under-sampling includes using the un-aliased time samples resulting from only a sub-set of the multiple transmit elements or the multiple receive elements of the first radar system.

In addition to one or more of the features described herein, the method also includes selecting the first configuration and the second configuration from a set of configurations evaluated based on training a general neural network.

In another exemplary embodiment, a system to use deep learning for de-aliasing in a radar system includes a first radar system to obtain un-aliased time samples from reflections based on transmissions of multiple frequency-modulated signals. The first radar system includes multiple transmit elements and multiple receive elements. The system also includes a processor to under-sample the un-aliased time samples to obtain aliased time samples corresponding with a first configuration of an ambiguous radar system, to implement a matched filter on the un-aliased time samples to obtain an un-aliased data cube and on the aliased time samples to obtain an aliased data cube, to process the aliased data cube with a first neural network to obtain a de-aliased data cube, to train the first neural network based on a first loss obtained by comparing the un-aliased data cube with the de-aliased data cube to obtain a trained first neural network, to repeat the process of under-sampling the un-aliased time samples to obtain second aliased time samples corresponding with a second configuration of the ambiguous radar system, to train a second neural network using the second configuration of the ambiguous radar system to obtain a trained second neural network, and to compare results of the trained first neural network and the trained second neural network to choose a selected neural network corresponding with a selected configuration of the ambiguous radar system. A second radar system is configured according to the selected configuration of the ambiguous radar system and uses the neural network to detect one or more objects.

In addition to one or more of the features described herein, the second radar system is in a vehicle.

In addition to one or more of the features described herein, the processor performs detection of the one or more objects using the un-aliased data cube and using the de-aliased data cube.

In addition to one or more of the features described herein, the processor trains the neural network based on a second loss obtained by comparing a result of the detection performed using the un-aliased data cube with a result of the detection performed using the de-aliased data cube.

In addition to one or more of the features described herein, the processor inverts the de-aliased data cube to obtain de-aliased time samples.

In addition to one or more of the features described herein, the processor trains the neural network based on a third loss obtained by comparing the un-aliased time samples with the de-aliased time samples.

In addition to one or more of the features described herein, the processor under-samples the un-aliased time samples by using all the un-aliased time samples resulting from only a sub-set of the multiple frequency-modulated signals.

In addition to one or more of the features described herein, the processor under-samples the un-aliased time samples by using only a sub-set of the un-aliased time samples resulting from all the multiple frequency-modulated signals.

In addition to one or more of the features described herein, the processor under-samples the un-aliased time samples by using the un-aliased time samples resulting from only a sub-set of the multiple transmit elements or the multiple receive elements of the first radar system.

In addition to one or more of the features described herein, the first configuration and the second configuration are selected from a set of configurations used to train a general neural network.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, radar systems may be used in a variety of applications. For example, radar systems may provide information that is used to augment or automate vehicle operation. A vehicle radar system may be a single input multiple output (SIMO) system with multiple transmit elements and a single receive element or a multiple input multiple output (MIMO) system with multiple transmit and receive elements, for example. In addition, a vehicle radar system may transmit a linear frequency modulated continuous wave (LFMCW) signal, also referred to as a chirp, for example. Certain design choices for a radar system result in aliasing, which is a phenomenon of uncertainty in the actual position of a detected object. Under-sampling in some capacity (e.g., sparse transmitted signal), while resulting in reduced cost and power consumption, may also result in aliasing.

Angle information is affected by the total array aperture or the number and spacing of antenna elements of the radar system (or the number of antenna elements for a given half-wavelength spacing). Thus, using a radar system with a sparse sub-set of elements such that the elements are not separated by a half-wavelength, for example, results in angular aliasing. Range information is affected by the bandwidth (i.e., chirp frequency span) while maximum detectable range is a function of the spacing between time samples of the reflections. Thus, for a desired maximum range, processing a sparse sub-set of time samples for a given chirp width, with an inter-sample spacing that is too large, results in range aliasing. Doppler information (i.e., range rate) is affected by the duration of the frame that is processed by the receiver while maximum detectable range rate or Doppler is a function of the chirp-to-chirp spacing (chirp repetition interval). Thus, for a desired maximum Doppler, using a sparse sub-set of chirps for a given frame width, with an inter-chirp spacing that is too large, results in Doppler aliasing.

Embodiments of the systems and methods detailed herein relate to deep learning for de-aliasing and configuring a radar system. De-aliasing refers to the process of retrieving aliasing-free signals by filtering out the false replicas (i.e., the aliases). Deep learning is a type of machine learning that learns the hierarchical representation of data and may be supervised or unsupervised. Supervised learning requires ground truth annotations, while the embodiments described relate to a self-supervised approach in which the annotations are inherited in the data itself. According to the embodiments, while data is initially under-sampled by a given radar system so as to result in aliasing, that data is de-aliased using deep learning. Thus, the embodiments include a learning aspect and an implementation aspect. For explanatory purposes, the radar system that provides un-aliased signals and is used for training purposes is referred to as an unambiguous radar system, and the radar system that needs the trained neural network for de-aliasing because it provides aliased signals is referred to as an ambiguous radar system.

According to additional embodiments, the specific configuration of the ambiguous radar system may be determined based on the deep learning, as well. The un-aliased signals provided by the unambiguous radar system may be aliased in different ways such that the neural network is trained to perform de-aliasing under a set of aliasing conditions. As detailed, analysis of the trained neural network may then be used to narrow down the set of aliasing conditions to a subset, train neural networks for each of the subset, and determine the configuration of the ambiguous radar system that is subsequently deployed in vehicles based on a comparison of the performance of the neural networks trained for the subset. That is, the aliased configuration for which the trained neural network provides the best results may be used. By using the trained neural network for de-aliasing, the resource efficiencies of an ambiguous radar system can be achieved without incurring the accuracy penalty that is typical of aliased data.

Figure 1:
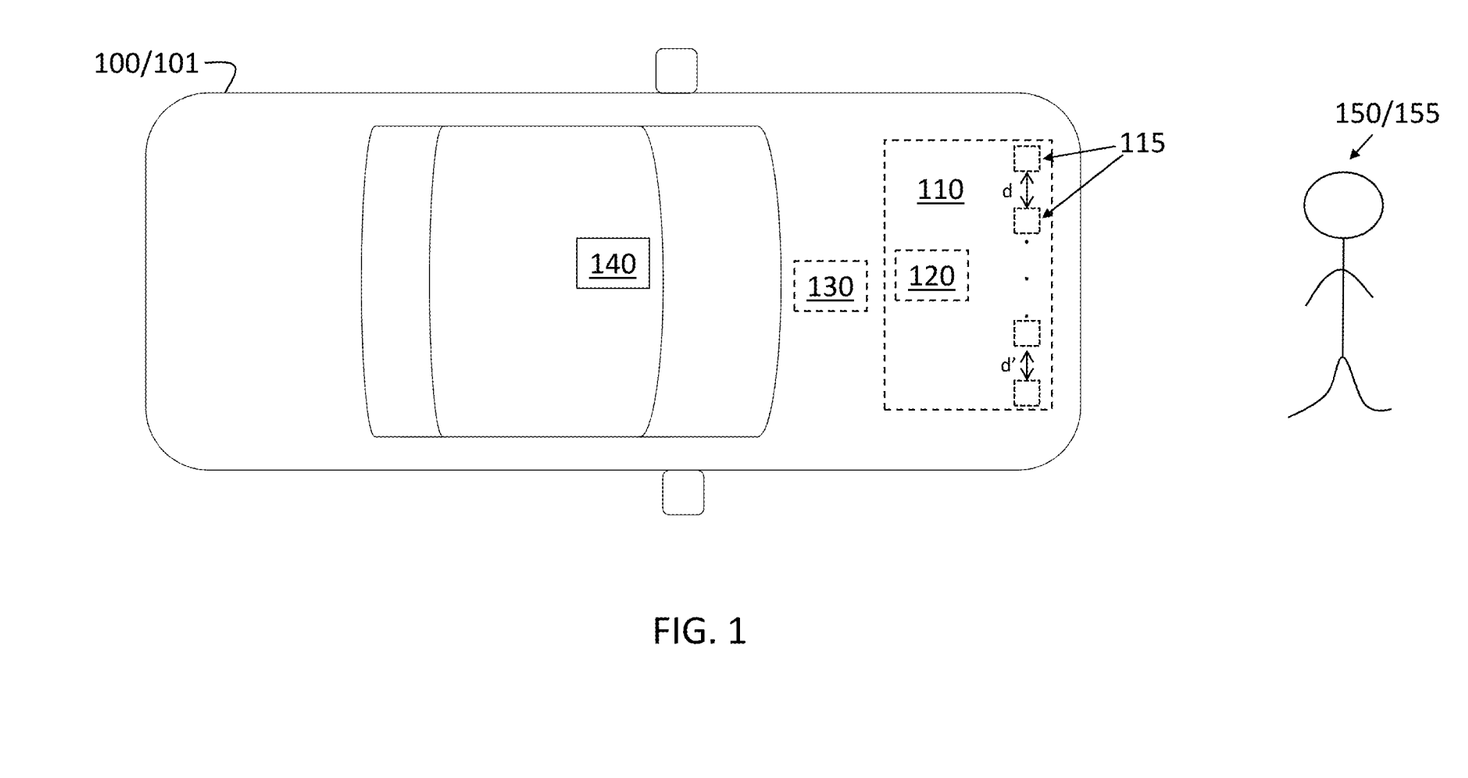
FIG. 1 is a block diagram of a vehicle that can perform deep learning for de-aliasing in a radar system according to one or more embodiments.

In accordance with an exemplary embodiment, FIG. 1 is a block diagram of a vehicle 100 that can perform deep learning for de-aliasing in a radar system 110. The vehicle 100 shown in FIG. 1 is an automobile 101. The exemplary vehicle 100 includes the radar system 110 (an ambiguous radar system) and may additionally include other sensors 140 (e.g., lidar, camera) to detect and track objects 150 such as the pedestrian 155 shown in FIG. 1. The vehicle 100 also includes one or more vehicle controllers 130 (e.g., electronic control unit (ECU)). The vehicle controllers 130 may control aspects of the operation of the vehicle 100 or may control automation of the vehicle 100 based on information from the radar system 110. The radar system 110 is shown with an array of antenna elements 115 and a radar controller 120. As shown in FIG. 1, the antenna elements 115 may not be uniformly spaced apart such that one adjacent pair of antenna elements 115 is shown with a distance d between them and another is shown with a different distance d' between them.

The radar controller 120 may include an oscillator to generate chirps. Reflected signals received by the radar system 110 based on the reflection of transmitted chirps by objects 150 in the field of view of the radar system 110 may be processed by the radar controller 120, a vehicle controller 130, or a combination of the two. Both the radar controller 120 and vehicle controller 130 may include processing circuitry and other components. The processing circuitry may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 4:
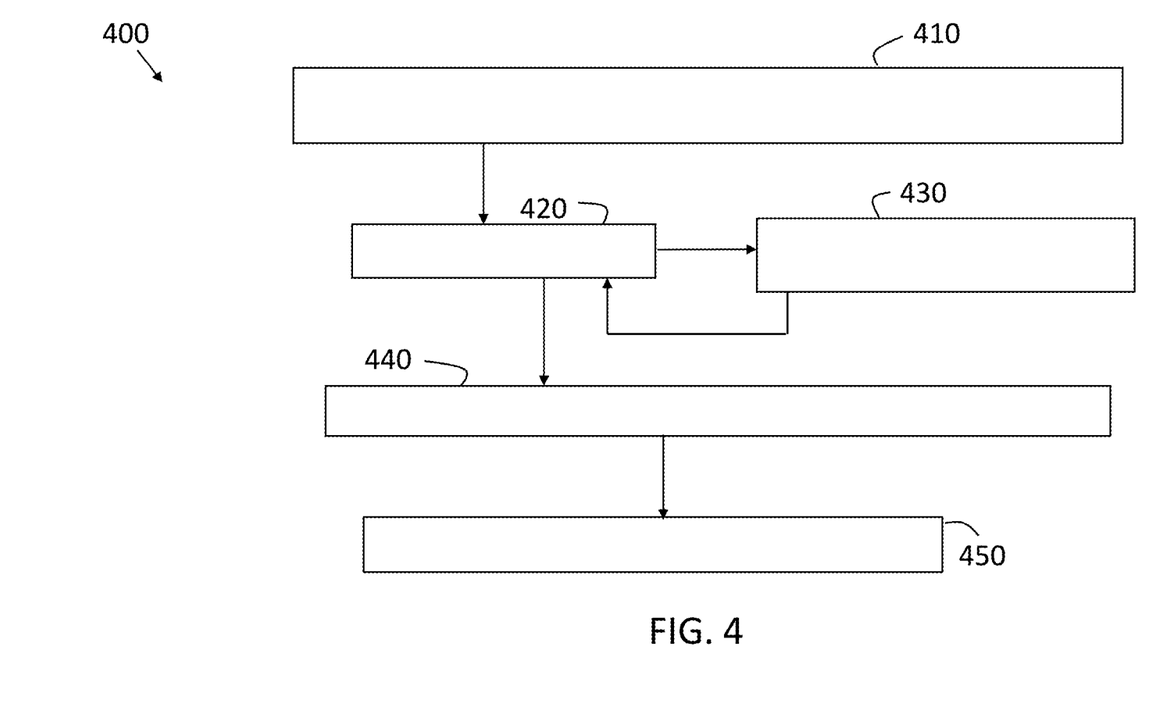
FIG. 4. shows the implementation flow associated with deep learning for configuring the radar system according to an exemplary embodiment.

As previously noted, according to one or more embodiments, the vehicle 100 uses deep learning to obtain de-aliased data from the radar system 110. Specifically, the radar controller 120, a vehicle controller 130, or a combination of the two may be used for the processes detailed herein. An unambiguous radar system that provides un-aliased signals may be used to train a neural network according to a deep learning process. Once trained, the neural network can be used with the radar system 110, which may be an ambiguous radar system that provides aliased signals, to provide de-aliased output. Thus, a single unambiguous radar system (i.e., one with sufficient sampling rate to avoid aliasing) may be used to train the neural network to be used with many ambiguous radar systems 110 in corresponding vehicles. The specific characteristics of the radar system 110 that affect aliasing are detailed with reference to FIGS. 6-8. FIG. 4 details the processes by which a configuration of the radar system 110 may be determined based on training and comparing the neural network for differently aliased data.

According to the embodiments detailed herein, a radar system 110 with characteristics that result in aliasing may nonetheless be used to obtain de-aliased detections of objects 150 based on training a neural network as detailed. In addition to being trained to de-alias the output of an ambiguous radar system 110, the neural network may also be used to select the spacing between the antenna elements 115 that facilitates the best de-aliasing results by the neural network among those tried. As previously noted, this spacing need not be uniform (i.e., spacing between two antenna elements 115 need not be the same as the spacing between two other antenna elements 115). Similarly, the inter-sample spacing and inter-chirp spacing, among those tried, for which the trained neural network provides the best result may also be selected. That is, the neural network may initially be trained for a set of configurations of ambiguous radars. The results of the neural network may be used to select a subset of the configurations for which neural networks are trained. The performance of these trained neural networks may then be compared to select a configuration from among the subset of configurations as the configuration for the radar system 110. In this way, a resource- and cost-efficient ambiguous radar system 110 may still be used but it may be configured to ultimately provide the best results with the trained neural network.

Figure 2:
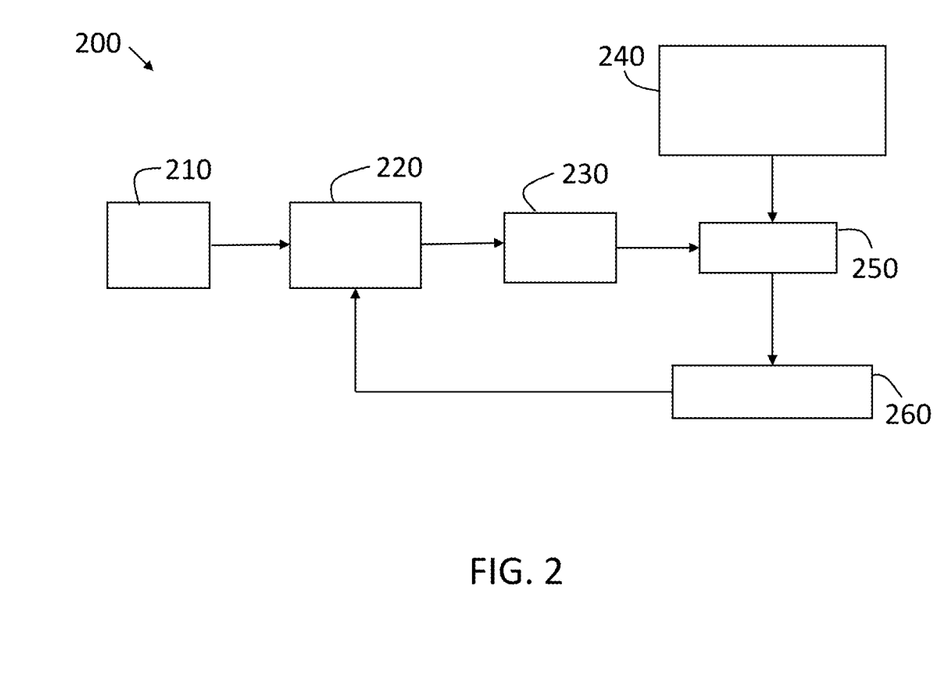
FIG. 2 is an exemplary general process flow of the training process for the neural network used to perform deep learning for de-aliasing in the radar system according to one or more embodiments.

FIG. 2 is an exemplary general process flow 200 of the training process for the neural network used to perform deep learning for de-aliasing in the radar system 110 according to one or more embodiments. The process flow 200 is for one iteration of one round of training, as further clarified with reference to FIGS. 3 and 4. At block 210, the processes include providing an input to a neural network. Based on processing of the input by the neural network, at block 220, an output is obtained at block 230. At block 240, obtaining ground truth for the output obtained at block 230 facilitates comparing the output of the neural network with the ground truth data, at block 250. The difference, according to the comparison at block 250, facilitates providing a loss, at block 260, to the neural network. This loss is back-propagated and used to update the neural network weights at block 220 during training.

In exemplary embodiments, which are detailed with reference to FIG. 3, the input provided, at block 210 of FIG. 2, is aliased data and the output, obtained at block 230 based on the neural network processing at block 220, is de-aliased data. This de-aliased output is compared, at block 250, with ground truth data obtained, at block 240, from an unambiguous radar system that, unlike the radar system 110, does not result in aliasing (i.e., provides un-aliased or aliasing-free data). The unambiguous radar system with aliasing-free data is used in the training of the neural network while the radar system 110 is deployed with the neural network in order to perform de-aliasing according to one or more embodiments. The loss provided, at block 260, according to the comparison of the de-aliased data obtained from the neural network with the aliasing-free data is used to improve the neural network processing. Specifically, weighting within the neural network is modified based on the loss. In the specific case of the neural network learning de-aliasing, all peaks (i.e., true and aliased) are obtained and correct matches to the true peaks are favored while incorrect matches to the aliased peaks are penalized. Hungarian loss may be used to solve the matching. As the discussion of FIG. 3 indicates, the loss used to train the neural network may be obtained at one or more of three different domains according to one or more embodiments.

As previously noted, according to additional embodiments, the training of the neural network, which may itself be an iterative process, may be repeated for different configurations (a subset of an initial set of configurations) of an ambiguous radar system. That is, the aliased data input at block 210 corresponds to a particular configuration of an ambiguous radar. For the same configuration, different aliased data may be input at block 210, which leads to the training process being iterative even for a single configuration of the ambiguous radar system. For a different configuration, the iterative training process may be repeated. Thus, different trained neural networks may be obtained for different configurations of the ambiguous radar. Based on which of the trained neural networks performs best, the configuration of the radar system 110 may be controlled to match the configuration used to train that neural network.

Figure 3:
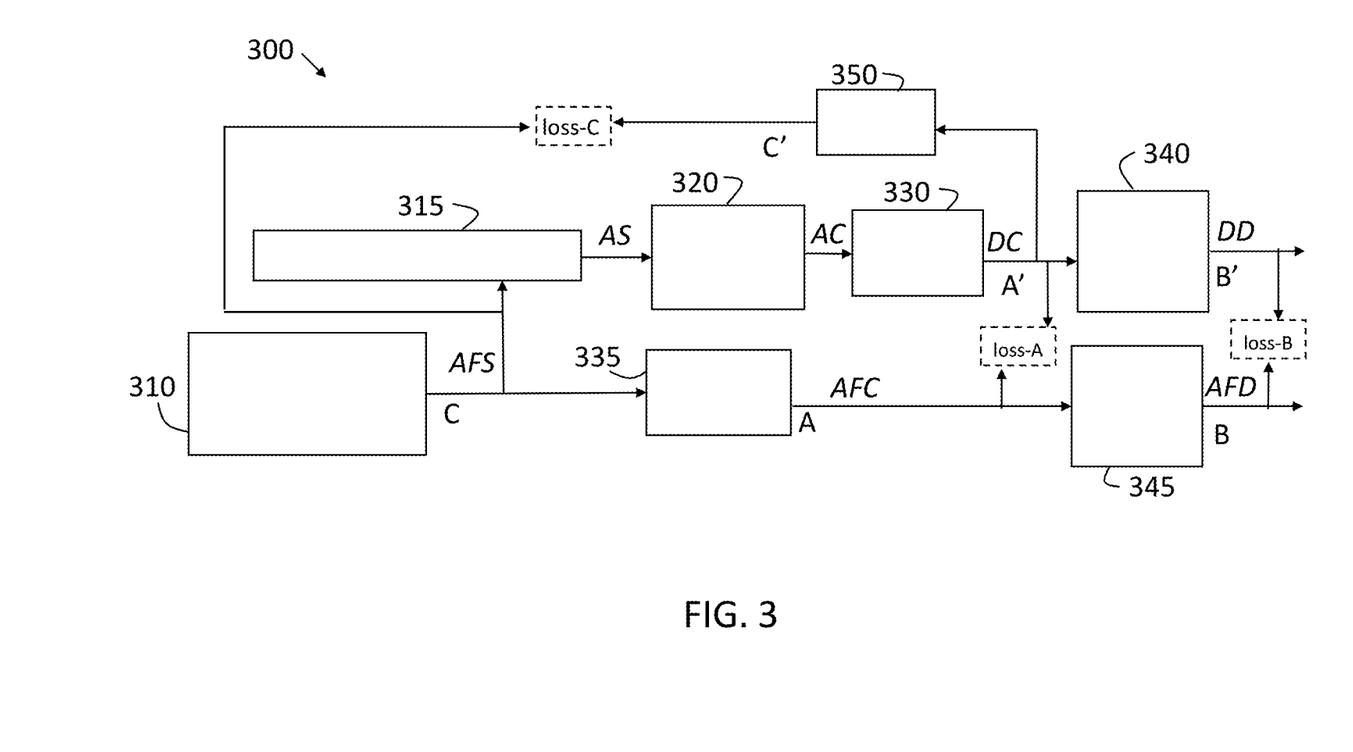
FIG. 3 shows the training process flow associated with deep learning for de-aliasing in the radar system according to an exemplary embodiment.

FIG. 3 shows the training process flow 300 associated with deep learning for de-aliasing in the radar system 110 according to an exemplary embodiment. The training process flow 300 provides a more detailed illustration than the general process flow 200 shown in FIG. 2. The training process flow 300 indicates multiple sources of loss, at multiple levels, that may be used to train the neural network. As previously noted, the processes shown in FIG. 3 may be performed by the radar controller 120, a vehicle controller 130, or a combination. At block 310, obtaining un-aliased radar output refers to obtaining aliasing-free samples AFS from reflected signals based on an unambiguous radar system (rather than radar system 110). As previously noted, the unambiguous radar system has hardware and processing aspects that enable providing un-aliased data, as compared with the radar system 110. As one example, the un-aliased radar output obtained at block 310 may be based on more antenna elements 115 than those of the radar system 110. At block 315, performing under-sampling on the aliasing-free time samples AFS (also indicated as C), obtained at block 310, may be accomplished in a number of ways, as detailed with reference to FIGS. 5-7. The result of the processing at block 315 is samples that suffer from aliasing (i.e., aliased time samples) AS. The generation of the AFS-AS pairs is a form of self-supervised learning. As further discussed with reference to FIG. 4, initially, the performing under-sampling, at block 315, can be for a set of aliasing conditions in order to train a general-purpose neural network. After a subset of these aliasing conditions (i.e., configurations for an ambiguous radar system) is selected, under-sampling, at block 315, can be according to one of the subset of configurations for the iterations associated with training one (specialized) neural network.

At block 320, applying a matched filter to the aliased time samples AS, obtained from the process at block 315, results in an aliased four-dimensional data cube AC. At block 335, applying a matched filter to the aliasing-free time samples AFS, obtained at block 310, results in an aliasing-free four-dimensional data cube AFC (also indicated as A). The aliasing-free time samples AFS and the aliased time samples AS are in the time domain (i.e., time samples for each transmitted chirp). The existing matched filter processing involves a two-dimensional fast Fourier transform (FFT) and a beamforming process. Specifically, a range FFT provides a range-chirp map which indicates energy distribution across range values for each transmitted chirp for each receive channel and transmit channel. A Doppler FFT combines chirps for each range bin of the range-chirp map resulting from the range FFT. The resulting range-Doppler map indicates relative velocity and range of each detected object. A beamforming process performed on the range-Doppler map than provides azimuth and elevation angles to each detected object. Thus, in both the aliased four-dimensional data cube AC and the aliasing-free four-dimensional data cube AFC, the four dimensions are range, Doppler, azimuth, and elevation.

At block 330, processing of the aliased four-dimensional data cube AC by the neural network results in the de-aliased four-dimensional data cube DC (also indicated as A'). As FIG. 2 indicates, comparison (at block 250) of the output of the neural network (block 230) with ground truth (block 240) provides a loss, at block 260, that may be provided as feedback to improve the deep learning of the neural network.

In the training process flow 300, there are three sets of comparisons and, thus, three sources of loss that may be combined or considered individually in the deep learning by the neural network (at block 330). The first comparison may be of A and A'. That is, the aliasing-free four-dimensional data cube AFC output by the matched filter at block 335 can be compared with the de-aliased four-dimensional data cube DC output by the neural network at block 330.

The difference, loss_A, may be provided to the neural network as feedback. This loss, loss_A, can be considered a data cube "image" loss due to the image-like structure of the data cube. Loss_A may be, for example, a combination of reconstruction loss (element-wise differences between AFC and DC using L1/L2 norm), perceptual loss (difference between "deep" features of AFC and DC generated by processing the data cubes with a pre-trained deep neural network such as the Visual Graphics Group (VGG) network), and adversarial loss (using Generative-Adversarial-network architecture, adding a discriminator network with the goal to determine whether the data cube was produced by the unambiguous radar (i.e., is AFC at block 335) or was produced by the neural network (i.e., is DC at block 330)).

The second comparison may be of B and B'. At block 345, performing detection on the aliasing-free four-dimensional data cube AFC output by the matched filter at block 335 results in detection information (i.e., aliasing-free detection information AFD, also indicated as B) that indicates range, Doppler, azimuth, and elevation to each detected object. Similarly, at block 340, performing detection on the de-aliased four-dimensional data cube DC output by the matched filter at block 330 results in detection information (i.e., de-aliased detection information DD also indicated as B') that indicates range, Doppler, azimuth, and elevation to each detected object. The difference resulting from comparing the aliasing-free detection information AFD (B) to the de-aliased detection information DD (B'), loss_B, may be provided to the neural network as feedback. This loss, loss_B, can be considered an output point cloud loss with the points being the radar detections (i.e. points in four dimensions (three dimensions and Doppler)). The comparison is of two point-clouds based on pairwise point distance, nearest neighbor point search, or density matching, for example. This loss directly measures the quality of the radar final output and may be used to ensure that the de-aliasing process produces realistic and meaningful data.

The third comparison may be of C and C'. As indicated in FIG. 3, the de-aliased four-dimensional data cube DC output by the neural network at block 330 may be provided for inversion, at block 350. Inverting, at block 350, refers to converting the de-aliased four-dimensional data cube DC back to the time domain samples indicated at C'. As previously noted, the aliasing-free time samples AFS are also indicated as C. The L1 or L2 norm of the difference resulting from comparing the aliasing-free time samples AFS (C) to the samples C' resulting from the inversion, at block 350, loss_C, may be provided to the neural network as feedback. This loss, loss_C, can be considered a time sample loss. According to an exemplary embodiment, all three losses, loss_A, loss_B, and loss_C, may be used together in the deep learning by the neural network. For example, a weighted loss, loss w, can be computed as:

$$\text{loss\_}w = \alpha * \text{loss\_}A + \beta * \text{loss\_}B + \gamma * \text{loss\_}C \quad [\text{EQ. 1}]$$

In EQ. 1, $\alpha$, $\beta$, and $\gamma$ are the weights respectively applied to loss_A, loss_B, and loss_C. The weights are optimized using a hyper-parameter search process.

The training process discussed with reference to FIG. 3 may be performed iteratively. At different iterations, different sub-arrays may be selected (at block 315), using one of the processes discussed with reference to FIGS. 6-8, from the same radar frame (obtained at block 310). In addition, as previously noted, the iterative process of training the neural network (shown by the process flow 300 in FIG. 3) can be repeated to test different configurations for the ambiguous radar system 110 (e.g., different number of antenna elements 115, different spacing between the antenna elements 115, different inter-sample spacing, different inter-chirp spacing (at block 315, FIG. 3)).

FIG. 4 shows the process flow 400 for deep learning for configuring the radar system 110 according to one or more embodiments. At block 410, selecting a set of configurations of the ambiguous radar system refers to the specific way that under-sampling is performed at block 315 (FIG. 3). Performing deep learning, at block 420, is according to the processes discussed with reference to FIG. 2, generally, and FIG. 3, specifically. As noted, the processes shown in FIG. 3 may be performed iteratively for the same candidate configuration. For the set of configurations selected at block 410, a single (general-purpose) neural network is trained according to the flow discussed with reference to FIGS. 2 and 3. At block 430, evaluating results to select a subset of configurations refers to aggregating statistics from the neural network to determine the subset of configurations for which the neural network scored well. A (specialized) neural network is trained for each configuration in the subset, at block 420.

At block 440, evaluating neural networks for the subset of configurations refers to evaluating and comparing the accuracy of each neural network (trained at block 420) for each candidate configuration (selected at block 430). The evaluation results in the determination of the most accurate neural network and selection of the corresponding configuration among the subset of configurations. At block 450, providing the configuration selected at block 440 for implementation refers to configuring the radar system 110 according to the selected configuration.

Figure 5:
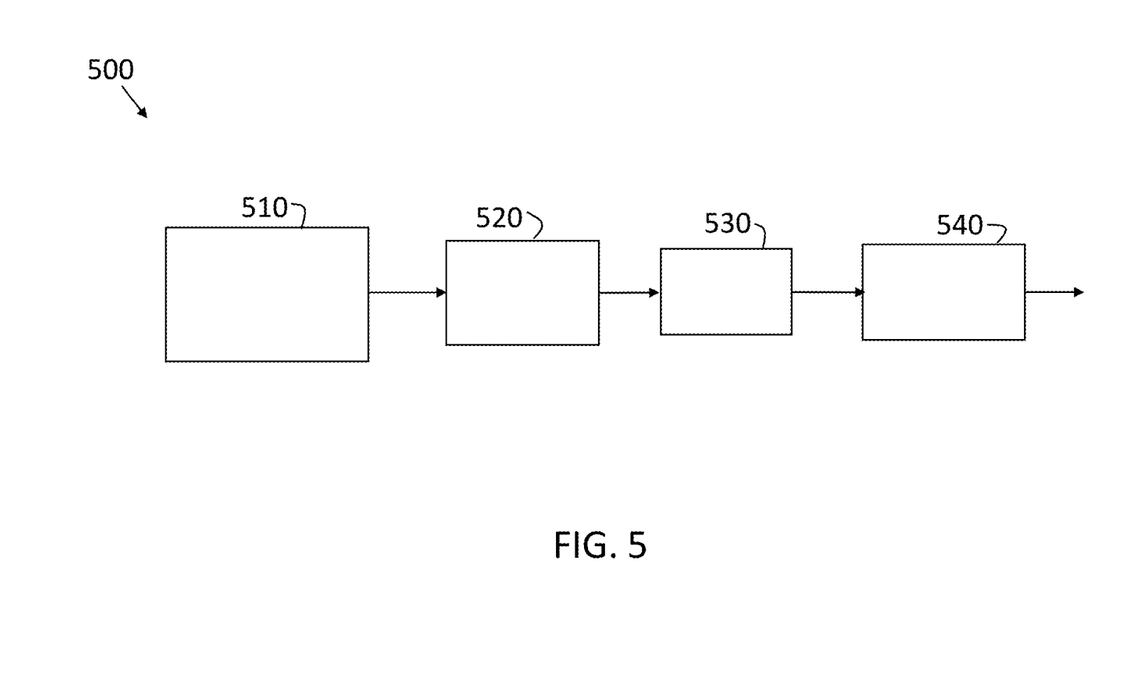
FIG. 5 shows the implementation flow associated with deep learning for de-aliasing in the radar system according to an exemplary embodiment.

FIG. 5 shows the implementation flow 500 associated with deep learning for de-aliasing in the radar system 110 according to an exemplary embodiment. The processes shown in FIG. 5 use the radar system 110, and the processing of reflections discussed with reference to FIG. 5 may be performed by the radar controller 120, a vehicle controller 130, or a combination. The neural network discussed with reference to block 330 (FIG. 3) and trained according to the process flow 300 discussed with reference to FIG. 3, as well as according to the process flow 400 discussed with reference to FIG. 4, is implemented (at block 530) to de-alias data obtained with the radar system 110.

At block 510, obtaining aliased radar output refers to obtaining time samples using the radar system 110. This data is aliased because the radar system 110 differs from the one (i.e., the unambiguous radar system) used in the training of the neural network according to the process flow 300 (FIG. 3). At block 520, implementing a matched filter refers to obtaining a four-dimensional data cube from the time samples (obtained at block 510). At block 530, implementing the neural network results in obtaining a de-aliased four-dimensional data cube from the four-dimensional data cube output by the matched filter (at block 520). Using a detection algorithm, at block 540, is on the de-aliased four-dimensional data cube output by the neural network (at block 530), rather than the four-dimensional data cube output by the matched filter (at block 520), which can cause misleading detections due to aliasing. Thus, the azimuth, elevation, range, and Doppler values for any detected object 150 are obtained without uncertainty between the true and aliased values, as would be the case for the radar system 110 without the benefit of de-aliasing by the neural network.

Figure 6:
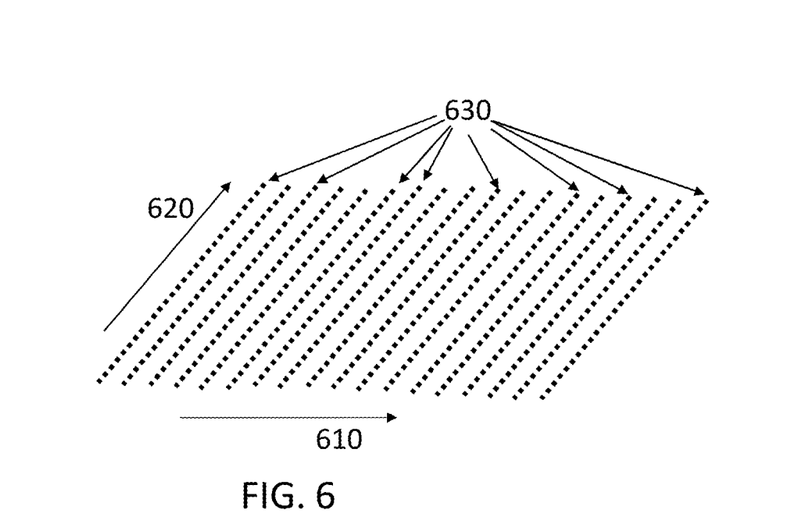
FIG. 6 illustrates under-sampling of range rate information to achieve deep learning for de-aliasing in a radar system according to one or more embodiments.
Figure 7:
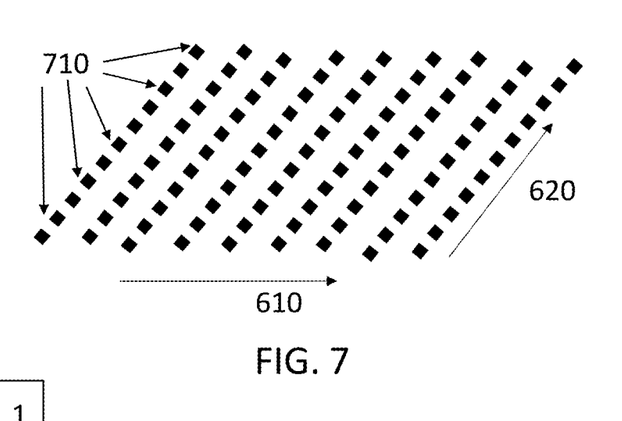
FIG. 7 illustrates under-sampling of range information to achieve deep learning for de-aliasing in a radar system according to one or more embodiments.
Figure 8:
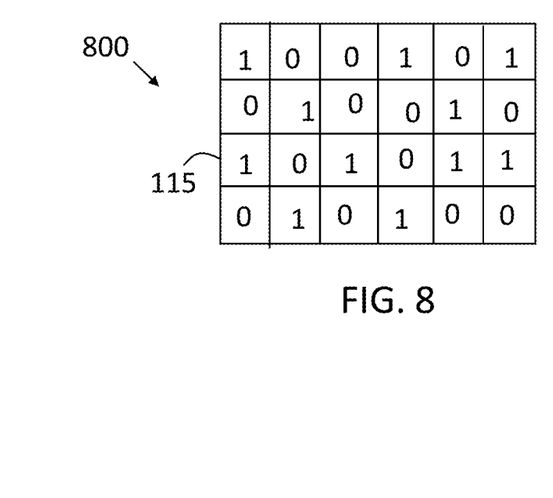
FIG. 8 illustrates under-sampling of angle information to achieve deep learning for de-aliasing in a radar system according to one or more embodiments.

FIGS. 6-8 illustrate exemplary embodiments for the process of under-sampling, at block 315 (FIG. 3). In determining exactly which sub-sets to use to under-sample the aliasing-free time samples AFS (at block 315), the actual radar system 110 may be considered. That is, for example, the actual number of antenna elements 115 of the radar system 110 may be used to select the size of the sub-set used to cause under-sampling at block 315 (FIG. 3). By training the neural network (at block 330, FIG. 3) using under-sampling that matches that of the radar system 110, implementing the neural network (at block 530, FIG. 5) may provide better results than if the training does not consider the actual radar system 110. According to alternate embodiments detailed with reference to FIG. 4, the under-sampling may be performed for candidate configurations that are used to select the configuration for the radar system 110.

FIG. 6 illustrates under-sampling of range rate information to achieve deep learning for de-aliasing in the radar system 110 according to one or more embodiments. FIG. 6 shows chirps along axis 610 and time samples along axis 620. As the exemplary chirp sub-arrays 630 indicate, under-sampling, at block 315 (FIG. 3) may include using all the time samples but from only a sub-set of the chirps to obtain the aliased time samples AS. In the exemplary case shown in FIG. 6, all of the time samples for only the chirps that are part of the sub-array 630 are used. As FIG. 6 indicates, the sub-array 630 need not be every other or every nth chirp (although it could be) but, instead, may be any sub-array 630 of the chirps that results in under-sampling of range rate information (i.e., Doppler aliasing).

FIG. 7 illustrates under-sampling of range information to achieve deep learning for de-aliasing in the radar system 110 according to one or more embodiments. FIG. 7 shows chirps along axis 610 and time samples along axis 620. As the exemplary sample sub-array 710 indicates, under-sampling, at block 315 (FIG. 3) may include using only a sub-set of the time samples from every chirp to obtain the aliased time samples AS. As FIG. 7 indicates, the sub-array 710 need not be every other time sample or every nth time sample (although it could be). The sub-array 710 may be any subset of time samples that results in under-sampling of range information (i.e., range aliasing).

FIG. 8 illustrates under-sampling of angle information to achieve deep learning for de-aliasing in the radar system 110 according to one or more embodiments. The full array of antenna elements 115 of an exemplary MIMO radar system (i.e., the unambiguous radar system) used to obtain the aliasing-free radar output, at block 310 (FIG. 3), is indicated as 800 in FIG. 8. Each "1" designates an antenna element 115 that is used and each "0" designations an unused antenna element 115 for purposes of under-sampling. In alternate exemplary embodiments, any subset of the antenna elements 115 that defy the half-wavelength rule may be used to perform under-sampling of angle information (i.e., angular aliasing).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of using deep learning for de-aliasing in a radar system, the method comprising:
obtaining unaliased time samples from reflections based on transmissions by a first radar system of multiple frequency-modulated signals, wherein the first radar system includes multiple transmit elements and multiple receive elements;
performing under-sampling of the un-aliased time samples to obtain aliased time samples corresponding with a first configuration of an ambiguous radar system;
implementing a matched filter on the un-aliased time samples to obtain an un-aliased data cube and on the aliased time samples to obtain an aliased data cube;
processing the aliased data cube with a first neural network to obtain a de-aliased data cube;
training a first neural network based on a first loss obtained by comparing the un-aliased data cube with the de-aliased data cube to obtain a trained first neural network;
repeating the performing the under-sampling of the un-aliased time samples to obtain second aliased time samples corresponding with a second configuration of the ambiguous radar system;
training a second neural network using the second configuration of the ambiguous radar system to obtain a trained second neural network;
comparing results of the trained first neural network and the trained second neural network to choose a selected neural network corresponding with a selected configuration of the ambiguous radar system; and
using the selected neural network with a second radar system that has the selected configuration of the ambiguous radar system to detect one or more objects.

2. The method according to claim 1, further comprising disposing the second radar system in a vehicle.

3. The method according to claim 1, further comprising performing detection of the one or more objects using the un-aliased data cube and using the de-aliased data cube.

4. The method according to claim 3, wherein the training the neural network is based on a second loss obtained by comparing a result of the detection performed using the un-aliased data cube with a result of the detection performed using the de-aliased data cube.

5. The method according to claim 1, further comprising inverting the de-aliased data cube to obtain de-aliased time samples.

6. The method according to claim 5, wherein the training the neural network is based on a third loss obtained by comparing the un-aliased time samples with the de-aliased time samples.

7. The method according to claim 1, wherein the performing the under-sampling includes using all the un-aliased time samples resulting from only a sub-set of the multiple frequency-modulated signals.

8. The method according to claim 1, wherein the performing the under-sampling includes using only a sub-set of the un-aliased time samples resulting from all the multiple frequency-modulated signals.

9. The method according to claim 1, wherein the performing the under-sampling includes using the un-aliased time samples resulting from only a sub-set of the multiple transmit elements or the multiple receive elements of the first radar system.

10. The method according to claim 1, further comprising selecting the first configuration and the second configuration from a set of configurations evaluated based on training a general neural network.

11. A system to use deep learning for de-aliasing in a radar system, the system comprising:
a first radar system configured to obtain un-aliased time samples from reflections based on transmissions of multiple frequency-modulated signals, wherein the first radar system includes multiple transmit elements and multiple receive elements;
a processor configured to under-sample the un-aliased time samples to obtain aliased time samples corresponding with a first configuration of an ambiguous radar system, to implement a matched filter on the un-aliased time samples to obtain an un-aliased data cube and on the aliased time samples to obtain an aliased data cube, to process the aliased data cube with a first neural network to obtain a de-aliased data cube, to train the first neural network based on a first loss obtained by comparing the un-aliased data cube with the de-aliased data cube to obtain a trained first neural network, to repeat the process of under-sampling the un-aliased time samples to obtain second aliased time samples corresponding with a second configuration of the ambiguous radar system, to train a second neural network using the second configuration of the ambiguous radar system to obtain a trained second neural network, and to compare results of the trained first neural network and the trained second neural network to choose a selected neural network corresponding with a selected configuration of the ambiguous radar system; and
a second radar system configured according to the selected configuration of the ambiguous radar system and configured to use the neural network to detect one or more objects.

12. The system according to claim 11, wherein the second radar system is in a vehicle.

13. The system according to claim 11, wherein the processor is further configured to perform detection of the one or more objects using the un-aliased data cube and using the de-aliased data cube.

14. The system according to claim 13, wherein the processor is configured to train the neural network based on a second loss obtained by comparing a result of the detection performed using the un-aliased data cube with a result of the detection performed using the de-aliased data cube.

15. The system according to claim 11, wherein the processor is further configured to invert the de-aliased data cube to obtain de-aliased time samples.

16. The system according to claim 15, wherein the processor is configured to train the neural network based on a third loss obtained by comparing the un-aliased time samples with the de-aliased time samples.

17. The system according to claim 11, wherein the processor is configured to under-sample the un-aliased time samples by using all the un-aliased time samples resulting from only a sub-set of the multiple frequency-modulated signals.

18. The system according to claim 11, wherein the processor is configured to under-sample the un-aliased time samples by using only a sub-set of the un-aliased time samples resulting from all the multiple frequency-modulated signals.

19. The system according to claim 11, wherein the processor is configured to under-sample the un-aliased time samples by using the un-aliased time samples resulting from only a sub-set of the multiple transmit elements or the multiple receive elements of the first radar system.

20. The system according to claim 11, wherein the first configuration and the second configuration are selected from a set of configurations used to train a general neural network.

* * * * *